United States Patent
Mitsuya et al.

[11] Patent Number: 5,510,614
[45] Date of Patent: Apr. 23, 1996

[54] SOLID SURFACE OBSERVATION METHOD AND APPARATUS THEREFOR, AND ELECTRONIC APPARATUS FORMED OF THE SOLID SURFACE OBSERVATION APPARATUS AND METHOD OF FORMING THE ELECTRONIC APPARATUS

[75] Inventors: Munehisa Mitsuya, Sakado; Yasuo Wada, Tokyo; Seiji Heike; Seiichi Kondo, both of Hiki, all of Japan

[73] Assignee: Hitachi, Ltd., Tokyo, Japan

[21] Appl. No.: 184,068

[22] Filed: Jan. 21, 1994

[30] Foreign Application Priority Data

Jan. 21, 1993 [JP] Japan .................................. 5-008152
Aug. 11, 1993 [JP] Japan .................................. 5-217936

[51] Int. Cl.$^6$ .................................................. H01J 37/00
[52] U.S. Cl. ........................................... 250/306; 250/307
[58] Field of Search .................................. 250/306, 307

[56] References Cited

U.S. PATENT DOCUMENTS

| | | | |
|---|---|---|---|
| 4,343,993 | 8/1982 | Binnig et al. | 250/306 |
| 4,724,318 | 2/1988 | Binnig | 250/306 |
| 4,829,507 | 3/1989 | Kazan et al. | |
| 4,837,435 | 6/1989 | Sakuhara et al. | 250/306 |
| 4,878,213 | 10/1989 | Kazan et al. | |
| 4,907,195 | 3/1990 | Kazan et al. | |
| 4,941,753 | 7/1990 | Wickramasinghe | 250/306 |
| 4,942,299 | 7/1990 | Kazmerski | 250/306 |
| 4,987,312 | 1/1991 | Eigler | |
| 5,166,919 | 11/1992 | Eigler | 250/306 |
| 5,262,642 | 11/1993 | Wessels et al. | 250/307 |

OTHER PUBLICATIONS

Nature, vol. 344.5, Apr. 1990, "Positioning Single Atoms With A Scanning Tunnelling Microscope", Eigler et al. pp. 524–526.

Primary Examiner—Bruce C. Anderson
Attorney, Agent, or Firm—Fay, Sharpe, Beall, Fagan, Minnich & McKee

[57] ABSTRACT

A surface of an insulator or semiconductor substrate is irradiated with a beam such as an electron beam, an electromagnetic wave beam, an ion beam, etc. to excite carriers so as to form an electrical conductive layer on the surface of and in the inside of the substrate to thereby make it possible to perform observation and micro working on the insulator by using a scanning tunneling microscope.

17 Claims, 2 Drawing Sheets

A

SOLID SURFACE OBSERVATION METHOD AND APPARATUS THEREFOR, AND ELECTRONIC APPARATUS FORMED OF THE SOLID SURFACE OBSERVATION APPARATUS AND METHOD OF FORMING THE ELECTRONIC APPARATUS

FIELD OF THE INVENTION

The present invention relates to formation of an electronic apparatus which functions in accordance with characteristics of a substrate surface, for example, formation of an atomic scale switching device on a surface of a solid, as well as observation of a surface of an insulator with a scanning tunnelling microscope and tunnelling spectroscopy.

BACKGROUND OF THE INVENTION

Heretofore, a scanning tunneling microscope (U.S. Pat. No. 4,343,993) has been used for observation of a surface of a solid. It has been applied to atomic scale observation of surfaces of various solids such as metals, semiconductors, organic compounds, and so on, and usefulness of such an application has been recognized. It has been further confirmed that atomic scale working can be performed on a surface of a solid by using a scanning tunneling microscope. That is, atoms on a surface of a solid can be moved, removed or added by controlling an electric field or an electric current between a probe and the surface of the solid.

That is, atoms in a specific position on a surface of a solid can be removed through application of a predetermined voltage between a probe and a substrate. Or, atoms deposited on a tip of a probe can be deposited onto a predetermined position on a surface of a substrate through application of a backward voltage between the probe and the substrate. An atomic scale micro pattern can be formed on a surface of a solid by using the aforementioned operations in combination.

SUMMARY OF THE INVENTION

A surface to be observed with the scanning tunneling microscope has electrical conduction is a necessary condition for a scanning tunneling microscope, because the scanning tunneling microscope uses a tunnelling current between the surface and a strobe. It has been, therefore, theoretically impossible to apply such a scanning tunneling microscope to insulating samples. It is considered that active operation devices, such as atomic scale switching devices, obtained by a combination of nanometer-size micro patterns, exist on the extension of the aforementioned operation technique.

To realize this, however, there remains clearly a serious technical problem to be solved. This problem is that a large part of respective constituent micro elements of an electronic device must be arranged on a surface of an insulator though a solid substrate on which a predetermined pattern will be formed. This requires electrical conduction for the purpose of forming such a predetermined pattern by the aforementioned atomic operation.

Because a semiconductor or an insulator has a large energy gap of the order of several eV between a valence electron band and a conduction band in its band structure, the carrier density thereof is low so that the electrical conductivity thereof is remarkably small compared with that of a metal or the like. The present invention therefore keeps an eye on the fact that carriers such as positive holes or electrons can be produced newly in the valence electron band or in the conduction band respectively when electrons in the valence electron band are excited toward the conduction band by energy given from the outside. That is, a beam, such as an electron beam, an electromagnetic wave beam, an ion beam, etc. having a larger energy value than the value of the energy gap is radiated onto a surface of a semiconductor or insulator. By this beam irradiation, an electrical conductive layer is formed in the vicinity of the surface of the insulator to make it possible to observe the surface with a scanning tunneling microscope. By constituting an electrical conductive layer on the surface in this condition and then removing the afore-mentioned beam to recover the insulating property of the surface, the resulting device can be made to function as an electronic device.

Further, a solid whose electrical conductivity can be changed in accordance with the temperature change of the substrate, the addition/subtraction of impurities, and so on, is used as a substrate on which atoms or molecules are operated. It is therefore proposed that an artificial structure in which a circuit is formed of atoms or molecules artificially arranged by a local electric field applied between a strobe and a substrate in the condition that the electrical conductivity of the substrate is large is made to function as an electronic apparatus by making the substrate change to an insulator.

An object of the present invention is therefore to provide a method of observing a surface of an insulator.

Another object of the present invention is to provide a micro electronic apparatus having different kinds of atoms or molecules artificially integrated on a surface of an insulator.

DESCRIPTION OF THE PREFERRED EMBODIMENTS

The present invention will be described below in detail on the basis of embodiments thereof.

A method of observing a surface of an insulator, which is one of the objects of the present invention, is now described on the basis of an embodiment of a beam assisted scanning tunneling microscope using electron beam irradiation.

EMBODIMENT 1

Figure 1:
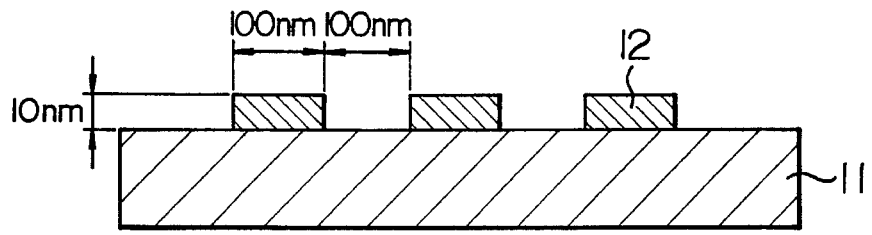
FIG. 1 is a cross sectional view showing a pattern form of silicon oxide formed on a silicon substrate.

As shown in FIG. 1, 10 nm-thick 100 nm-wide silicon oxide films 12 were formed at intervals of 100 nm on a silicon substrate 11 to thereby prepare a sample. The sample was observed with a scanning tunnelling microscope under the conditions that a probe side bias voltage was set to 500 mV and a tunnelling current was set to 1.0 nA while an electron beam accelerated by 20 keV was being scanned on the sample in a vacuum.

Figure 2:
FIG. 2 is a scanning tunneling microscope photograph of a silicon oxide pattern obtained on a silicon substrate by electron beam irradiation.

FIG. 2 is a photograph showing a scanning tunneling microscope image of a 1000 nm×1000 nm region obtained at the time of electron beam irradiation. The density represents height. That is, the white portion shows a high position. The portion which is considered as silicon oxide is seen like a belt with the height of about 10 nm, so that it is thought of that a pattern form on the surface of the sample is observed. The reason why the width of a groove between the silicon oxide films looks like a narrower width than the true width is that the radius of curvature in a tip of a probe is larger than the groove width so that the probe cannot enter into the bottom of the groove.

Further, an experiment was performed in the aforementioned manner in the condition that electron beam irradiation was stopped. It was confirmed from the experiment that there was no image obtained in this condition. Although this embodiment shows the case where electron beam irradiation is performed through scanning on the surface of the sample, the present invention may be applied to the case where a wide electron beam is radiated over the whole surface of the sample at once.

Figure 3A:
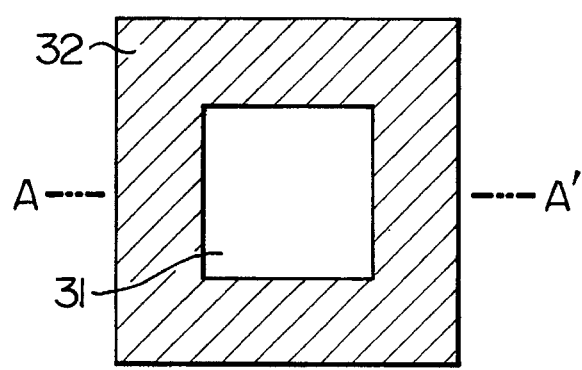
FIG. 3A is a plan view showing an example of the configuration of a sample electrode.
Figure 3B:
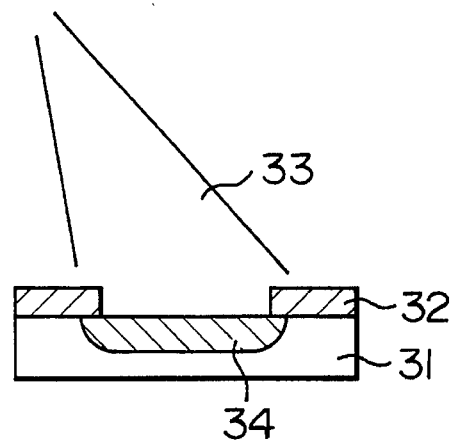
FIG. 3B is a cross sectional view taken along the line A—A' of FIG. 3A and showing the same example of the configuration of the sample electrode.
Figure 3C:
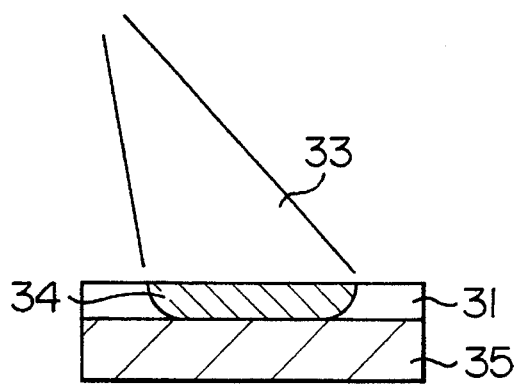
FIG. 3C is a cross sectional view showing another example of the configuration of an electrode in a film sample.

Further, in order to secure an inflow or outflow passage for carriers produced in the sample, an electrical conductive layer thus formed must be electrically in contact with an electrode connected to the sample. To this end, an electrode 32 is provided to surround the surface of the insulator sample 31 as shown in FIG. 3A which is a plan view and in FIG. 3B which is a cross sectional view taken along the line A—A' of FIG. 3A. When an electron beam 33 is radiated onto the surface of the sample, an electrical conductive layer 34 is formed so that contact between the electrode 32 and the electrical conductive layer 34 is achieved. Alternatively, as shown in FIG. 3C, in the case where the insulator sample 31 is a film formed on an electrical conductive substrate 35, contact between an electrical conductive layer 34 thus formed and the electrical conductive substrate 35 is achieved so that the electrical conductive substrate 35 can be utilized as an electrode 32 directly.

Figure 3D:
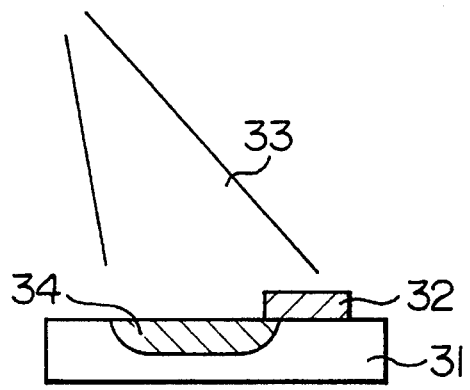
FIG. 3D is a cross sectional view showing a further example of the configuration of a sample electrode.

Any electrode shape may be used as long as the electrical conductive layer 34 and the electrode 32 are in contact with each other. Alternatively, as shown in FIG. 3D, the electron beam 33 may be radiated so as to be applied onto the electrode 32 inclusively. Any material, for example, a metal such as aluminum, gold, silver, etc. or a semiconductor such as silicon, etc., may be used for the electrode 32 and the electrical conductive substrate 35 as long as it has electrical conduction.

When the distance from the electrode 32 to the electrical conductive layer 34 to be measured was not larger than about 10 mm, an effective result was attained. When the distance was not larger than 10 μm, a particularly good result was attained. When the current density of the electron beam 33 and the acceleration voltage were not smaller than about 1 fA/cm$^2$ and not lower than the band gap of the sample to be measured, respectively, an effective result was achieved. When these values were 1 μA/cm$^2$ and 20 keV respectively, a particularly good result was achieved.

Further, tunnelling spectroscopy may be carried out by stopping the probe on the surface of the sample under the condition of electron beam irradiation and then by measuring I-V characteristic while the bias voltage is being changed. Accordingly, a dI/dV-V characteristic curve can be obtained, so that the state density of the insulator in the vicinity of the Fermi level can be found.

EMBODIMENT 2

This embodiment shows an example of a beam assisted scanning tunneling microscope using electromagnetic wave irradiation. A 100 nm-thick diamond film was observed with a scanning tunneling microscope under the conditions where a probe side bias voltage was set to 500 mV and a tunnelling current was set to 1.0 nA while a ultraviolet beam having a wavelength of 200 nm was being radiated onto the diamond film by using a deuterium lamp in a high vacuum. It was confirmed that a scanning tunneling microscope image expressing the shape of the sample surface was achieved at the time of ultraviolet beam irradiation whereas there was no image achieved at the time of stopping of ultraviolet beam irradiation. Further, tunnelling spectroscopy was carried out to obtain a tunnelling spectrum of the diamond film.

In this embodiment, like in the Embodiment 1, any electrode shape may be used as long as the electrical conductive layer and the electrode are in contact with each other. The distance between the electrode and the measurement position of the electrical conductive layer was selected to be the same as in Embodiment 1. It is further necessary that the energy of the electromagnetic wave radiation is larger than the energy gap of the sample. Even in the case where the energy is smaller than the energy gap value of the sample to be measured, however, measurement can be made as long as doping can occur in multi-photon transition. When, for example, light with a wavelength of 800 nm is radiated onto a KTP crystal, electrical conduction is achieved so that observation with the scanning tunneling microscope can be performed.

EMBODIMENT 3

This embodiment shows an example of a beam assisted scanning tunneling microscope using ion beam irradiation. An aluminum oxide sample was observed with the scanning tunneling microscope under the conditions where a probe side bias voltage was set to 500 mV and a tunnelling current was set to 1.0 nA while an ion beam accelerated by 20 keV was being radiated in a vacuum. It was confirmed that a scanning tunneling microscope image expressing the shape of the sample surface was achieved at the time of ion beam irradiation whereas there was no image achieved at the time of stopping of ion beam irradiation. Further, tunnelling spectroscopy was carried out to obtain a tunnelling spectrum of the aluminum oxide sample.

In this embodiment, like Embodiment 1, any electrode shape may be used as long as the electrical conductive layer and the electrode are in contact with each other. When the distance between the electrode and the measurement position of the electrical conductive layer was not larger than about 10 mm, an effective result was obtained. When the distance was not larger than 10 μm, a particularly good result was obtained. When the current density of the ion beam and the acceleration voltage were not smaller than about 1 fA/cm$^2$ and not lower than the energy gap value of the sample to be measured, respectively, an effective result was achieved. When these values were 1 μA/cm$^2$ and 20 keV respectively, a particularly good result was achieved. Any kind of ion, for example, oxygen molecule ion, nitrogen molecule ion, etc., may be used as the ion beam to be radiated. When a nitrogen molecule ion was used, a particularly good result was obtained.

EMBODIMENT 4

This embodiment shows an example of an atomic operation on a surface of an insulator or a semiconductor substrate by using a scanning tunneling microscope. Gold atoms were arranged on a single crystal silicon oxide substrate by using a probe of the scanning tunnelling microscope while an electron beam accelerated by 20 keV was radiated in a superhigh vacuum. Thus, two 1-nm-wide 1-μm-long thin lines parallel with each other were formed at a distance of 10 nm. Thereafter, the electron beam irradiation was stopped. It was confirmed that the two thin lines were electrically insulated from each other at the time of stopping of electron beam irradiation whereas the two thin lines were electrically connected to each other at the time of electron beam irradiation.

Any material formed of a single element such as diamond may be used or any material formed of a compound such as sapphire or aluminum oxide may be used as the substrate as long as it is an insulator. Any substrate structure, for example, single crystal, polycrystal or amorphous, may be used. As the atoms arranged on the substrate, metal atoms such as gold atoms, silver atoms, etc. or semiconductor atoms such as silicon atoms, etc. may be used. Alternatively, a compound such as a silicon and its compound or gallium arsenide may be used.

EMBODIMENT 5

Examples of a solid capable of reversible transition from an insulator to a conductor include materials having so-called photoconduction in which the number of carriers contributing to electrical conduction are increased to a larger value by light irradiation than the number of carriers in a state of thermal equilibrium. Examples of inorganic photoconductive materials used in this embodiment include: visible light absorbing materials such as Se, CdS, CdSe, CdTe, etc.; materials exhibiting photoconduction by absorbing near infrared light, such as PbS, PbSe, PbTe, Ge, Te, etc.; and materials using infrared light, such as InSb, InAs, etc. Examples of polymer materials exhibiting photoconduction include: polycyclic compounds, such as polyacene quinone radical, etc.; linear conjugated polymer, such as polyacetylene, polydiacetylene, etc.; so-called heat-resisting polymers such as poly-p-phenylene, polyimide, etc.; polymers having large aromatic or heterocyclic rings in principal or side chains of poly-N-vinylcarbazole and its derivatives, etc.; charge-transfer complexes thereof with low-molecular weight electron acceptor compounds; and other compounds such as polyvinyl halide, polyglycine, metal halide complexes, etc. It is a matter of course that a multi-layered structure in which a carrier generating layer and a carrier transporting layer are separated from each other may be used as the substrate. In this case, a photoconductive polymer may be used as a material constituting the carrier transporting layer or a material obtained by dispersing a low-molecular compound such as pyrazoline derivatives, triphenylmethane derivatives, triphenylamine, oxadiazole derivatives, etc. in an inert polymer may be used effectively as the material constituting the carrier transporting layer. In the case where one of the afore-mentioned materials is used as the substrate on which an atomic operation is carried out, a surface of the material is irradiated with light in advance so that the material is utilized in the state of high electrical conductivity. In this case, light may be radiated onto the whole substrate or selectively onto a narrow region of the substrate on which the atomic operation is carried out.

EMBODIMENT 6

A series of polymer materials which belong to the category of so-called electrical conductive polymers capable of improving electrical conductivity by doping are desirable as substrate materials used in the present invention. Among these, linear conjugated polymers such as polyacetylene, polydiacetylene, etc. or polythiophene, poly(p-phenylene sulfide), poly(p-phenylene oxide), etc. are preferable materials because the electrical conductivity can be changed widely by addition/subtraction of impurities.

On the other hand, it is known that the electrical conductivity of a polyacene having a conjugated bond developing in two dimensions is increased by intercalating an electron acceptor or electron donor thereto.

Accordingly, among these, polymers which are insulators or semiconductors before the intercalation can be used as materials for the substrate in the present invention. That is, an electrical conductive polymer material is turned to a high electrical conductivity state by doping of a compound to thereby make surface observation possible to form an electronic device, and the device is used as an electronic device in a stage in which the electric conductivity is reduced by releasing of the compound introduced by doping or by oxidation of the compound due to reaction between the compound and air.

Generally, the characteristic of these high-molecular-weight materials which is such that electric conductivity changes with the passage of time, in itself, is a serious defect in use of these polymer materials as electrical conductive materials. For the purpose of use in the present invention, the characteristic in which electric conductivity is lowered is however desirable. That is, after completion of the atomic operation, these electrical conductive materials spontaneously change to insulators so that the electronic device formed by the atomic operation and functioning in accordance with the change of the substrate surface characteristic can be utilized as an active device.

EMBODIMENT 7

As the material which undergoes a transition from an electrical conductor to an insulator, a material having electric conductivity which changes in accordance with the temperature change can be also utilized in the present invention. For example, a quasi-one dimension crystal such as an organic complex salt forms an insulator by crystal modification at a low temperature. Further, small band gap semiconductors such as silicon, etc. and oxides such as titanium oxide, vanadium oxide, etc. can be used in the present invention because they form insulating phases at a low temperature and transform to metal at a high temperature. Further, a series of oxide superconductive materials and organic superconductors which exhibit superconductivity at a low temperature are also preferable materials used in the present invention because they form electrical insulators at a high temperature.

Among the aforementioned materials, materials having electrical conductivity capable of reversible or non-reversible changing from a value not larger than $10^{-6}$ S/cm to a value not smaller than $10^{-3}$ S/cm are preferable, and materials having electrical conductivity capable of reversible or non-reversible changing from a value not larger than $10^{-9}$ S/cm to a value not smaller than $10^{-1}$ S/cm are particularly preferable. Most preferably, the change is reversible.

In such materials having electrical conductivity capable of changing reversibly or non-reversibly, it is a matter of course that it is preferable that the surface of each material is uniform geometrically, particularly uniform in atomic level. The surface shape, however, does not limit the scope of the present invention.

EMBODIMENT 8

While a single crystal of gallium arsenide was cooled with liquid nitrogen in a vacuum, the following operation was carried out on a surface of the crystal. That is, gold atoms were successively collected by scanning of a probe of a scanning tunneling microscope on the surface of the single crystal to form two 10 nm-wide 100 nm-long thin lines parallel with each other. The distance between the two thin lines was 20 nm. During the formation of the two thin lines, the surface of the gallium arsenide single crystal is continuously irradiated with light having a wavelength of 1 μm. After the formation of the thin lines, the gallium arsenide substrate was taken out into air. It was confirmed that the two thin lines were electrically insulated from each other under shading whereas the two thin lines were electrically connected to each other under light irradiation.

EMBODIMENT 9

Thiophene monomer was dissolved in nitrobenzene so that a polythiophene film was synthesized by electrochemical polymerization. Then, about 1 mol % of iodine was doped into the film. It had been already confirmed that such doping treatment made the electrical conductivity change to about 10 S/cm. Then, two gold lines similar to those in Embodiment 8 were formed, in an atmosphere of nitrogen, on a surface of the polythiophene substrate thus subjected to doping. After the substrate was then held in a vacuum container, the substrate was taken out into air. It was confirmed that the electrical conductivity of the polythiophene was lowered so that the two gold lines formed thereon were electrically insulated from each other.

EMBODIMENT 10

Silicon containing $10^{-8}$ boron atoms per 1 $cm^3$ was used as a substrate. While the substrate was kept at a temperature of 200 K., two gold lines were formed on a surface of the substrate in the same manner as in Embodiment 1. It was confirmed that the two gold lines were electrically insulated from each other when the substrate was cooled to the liquid nitrogen temperature after the formation of the gold lines. Even in the case where a silicon substrate containing phosphor and arsenic as impurities was used, the same effect was attained.

According to the present invention, a micro electronic device which functions in accordance with the change of substrate surface characteristic can be formed on a surface of an insulator. Accordingly, the present invention becomes a basic technique for forming an active operation device such as an atomic scale switching device formed by a combination of micro structures.

We claim:

1. A method of observing an electrically insulating surface of a material, comprising the steps of:

irradiating the surface with a beam so that the surface is made electrically conductive, wherein the beam is selected from a group consisting of an electron beam and an ion beam;

positioning an electrode probe of a scanning tunneling microscope close to the surface being irradiated, and applying a predetermined electric voltage between the electrode probe and the surface; and detecting a tunneling current flowing between the electrode probe and the surface.

2. A substrate surface observing method, wherein a surface of an electrical conductive substrate capable of transitioning to an electrical insulator reversibly or non-reversibly is observed through a local electric filed applied between the surface of said substrate and a tunneling probe in a condition in which said substrate is made conductive by irradiation with a beam selected from a group consisting of an electron beam and an ion beam.

3. A method of forming an electronic device on an electrically insulating surface of a material comprising the steps of:

irradiating the surface with a beam so that the surface is made electrically conductive, wherein the beam is selected from a group consisting of an electron beam, an ion beam and an electromagnetic wave;

positioning an electrode probe of a scanning tunneling microscope close to the surface being irradiated, and applying a predetermined electric voltage between the electrode probe and the surface; and positioning atoms on the surface by said scanning tunneling microscope so as to form an electronic device on the surface.

4. A method of forming an electronic device according to claim 3, wherein a photoconductive material is used as the substrate having variable electrical conductivity.

5. A method of forming an electronic device according to claim 3, wherein an electrical conductive polymer material is used as the substrate having variable electrical conductivity.

6. A method of forming an electronic device according to claim 3, wherein a material transiting from a metal to an insulator in accordance with a temperature change is used as the substrate having variable electrical conductivity.

7. A method of forming an electronic device according to claim 3, wherein a material having superconducting characteristic is used as the substrate having variable electrical conductivity.

8. A method of forming an electronic device which is obtained by positioning atoms or molecules on a surface of a substrate which is capable of changing electrical conductivity by electron or electromagnetic wave irradiation, changing a temperature of said substrate, de-doping impurities, or chemical change, through a local electric field applied between said substrate and a tunneling probe.

9. A method of forming an electronic device according to claim 8, wherein a photoconductive material is used as the substrate having variable electrical conductivity.

10. A method of forming an electronic device according to claim 8, wherein an electrical conductive polymer material is used as the substrate having variable electrical conductivity.

11. A method of forming an electronic device according to claim 8, wherein a material transiting from a metal to an insulator in accordance with a temperature change is used as the substrate having variable electrical conductivity.

12. A method of forming an electronic device according to claim 8, wherein a material having superconducting characteristic is used as the substrate having variable electrical conductivity.

13. An electronic device produced by positioning atoms or molecules on a surface of an electrical conductive substrate capable of transitioning to an electrical insulator reversibly or non-reversibly, through a local electric field applied between the surface of said substrate and a probe in a condition in which said substrate is made conductive by irradiation with a beam selected from a group consisting of an electron beam and an ion beam.

14. An electronic device according to claim 13, wherein a photoconductive material is used as the substrate having variable electrical conductivity.

15. An electronic device according to claim 13, wherein an electrical conductive polymer material is used as the substrate having variable electrical conductivity.

16. An electronic device according to claim 13, wherein a material transforming from a metal to an insulator in accordance with a temperature change is used as the substrate having variable electrical conductivity.

17. An electronic device according to claim 13, wherein a material having superconducting characteristic is used as the substrate having variable electrical conductivity.

* * * * *